BLOCKING-LAYER PHOTO-ELECTRIC CELL

Filed Aug. 16, 1960

INVENTORS
Hermann G. Grimmeiss
Hein Koelmans.
BY
Frank R. Jifari
AGENT

United States Patent Office 3,092,725

Patented June 4, 1963

3,092,725

BLOCKING-LAYER PHOTO-ELECTRIC CELL

Hermann Georg Grimmeiss, Aachen, Germany, and Hein Koelmans, Eindhoven, Netherlands, assignors to North American Philips Company, Inc., New York, N.Y., a corporation of Delaware Filed Aug. 16, 1960, Ser. No. 50,010
Claims priority, application Germany Aug. 29, 1959
6 Claims. (Cl. 250—212)

The invention relates to a blocking-layer photo cell, particularly for the indication or for intensity measurement of a radiation in the short-wave and/or long-wave range of the visible spectrum or for the conversion of such radiation into electrical energy, by means of a semi-conductive body which comprises at least one p-n junction, in the proximity of which the radiation strikes the body.

Such blocking-layer photocells with a p-n junction may, as is known, be used as photo-E.M.F. cells utilizing the photovoltaic effect, the cell being then operated without a bias voltage, while the voltage difference and/or the current produced under the action of the incident radiation at two electrodes lying one on each side of the p-n-junction or the variation of these magnitudes with the intensity of the incident radiation are utilized. As is known, blocking-layer photocells may, however, be operated with a bias voltage as photo-diodes or photo-transistors, a voltage being applied in the blocking direction, to the p-n junction and the variation of the blocking resistance with the action of the incident radiation energy being utilized. The radiation energy strikes the semi-conductive body as near as possible to the p-n junction, particularly within a range of a few diffusion lengths of the charge carriers, since in the case of a larger distance the charge carriers can no longer reach the p-n-junction and hence can no longer produce the desired photo-electric phenomena.

The known blocking-layer photocells with a p-n junction have a spectral sensitivity range which depends mainly upon the size of the forbidden energy zone between the valence band and the conduction band of the semi-conductor employed. The sensitivity to a radiation of a larger wavelength than that of the wavelength corresponding to the forbidden energy done is substantially equal to zero in accordance with the present theory according to which the photovoltaic effect requires the generation of two types of charge carriers; with a wavelength of the value corresponding to the forbidden energy zone the sensitivity increases strongly and attains a maximum, whereas with shorter wavelengths the sensitivity decreases strongly owing to the absorption of radiation in the semi-conductor before the radiation has been capable of penetrating into the effective range of the p-n junction.

From the experiments leading to the invention it has been found that semi-conductor bodies of galliumphosphide with a p-n junction exhibit particular photo-electric properties, particularly with respect to the spectral distribution. The compound of galliumphosphide as a semi-conductor with a size of the forbidden energy zone of about 2.3 ev. is already known, for example, from the book "Halbleiter and Phosphore," edition Friedrich Vieweg und Sohn, Braunschweig, 1958, pages 547–551. With the experiments described in this publication rectification and luminescence properties were found with metal semi-conductor contacts on galliumphosphide bodies, but no photo-conductivity was found in the galliumphosphide.

On the basis, inter alia, of the surprising experimental discovery that galliumphosphide bodies with a p-n junction have a high photo-sensitivity to a radiation of the short-wave portion of the visible spectrum, and, with suitable doping, also in the long-wave portion of the visible spectrum, while the size of the forbidden energy zone of galliumphosphide corresponds only to the central part of the visible spectrum, the present invention provides a particularly suitable blocking-layer photocell, especially for use in the said ranges of the visible spectrum, the cell comprising a semi-conductive body having at least one p-n junction, in the proximity of which the radiation strikes the semi-conductive body.

In accordance with the invention, the semi-conductive body of such a block layer photocell consists of galliumphosphide at least an active region of the body producing a photo-effect. The active region of the semi-conductive body producing a photo-effect is to be understood to mean herein that part which contributes, in particular, to the spectral sensivity of the blocking-layer photocell and, more particularly, the part of the semi-conductive body lying in the effective range of the p-n junction and struck for the major part by the incident radiation beams. Although in many cases the semi-conductive body will mainly consist of galliumphosphide, it is also possible, within the scope of the present invention, to convert the semi-conductive body partly into a different semi-conductive compound, if desired for example for the application of suitable electrodes.

With the blocking-layer photocell according to the invention, the sensitivity, at least in the spectral ranges concerned, is materially higher than with the blocking-layer photocells known for the said spectral ranges, particularly with the conventional selenium blocking-layer photocell. Owing to this high sensitivity, the blocking-layer photocell according to the invention is particularly suitable for use as photo-voltaic cells, which are driven without bias voltage. Even without an additional doping element a high sensitivity is already obtained in the short-wave portion of the spectrum. By providing crystal defects or impurities in the part influencing the photo-effect, particularly by introducing an excess quantity of gallium (phosphor defects) or by the introduction of foreign atoms such as zinc, or cadmium or copper, a high sensitivity may be obtained also in the long-wave portion of the visible spectrum. What is the most remarkable about the inventive device is that a photo-E.M.F. is generated with radiation having a wavelength above the absorption edge of the GaP compound. The absorption edge for GaP is about 5450 A.

The invention will now be described more fully with reference to a few examples, which are shown in the drawing.

Figures 1, 2:
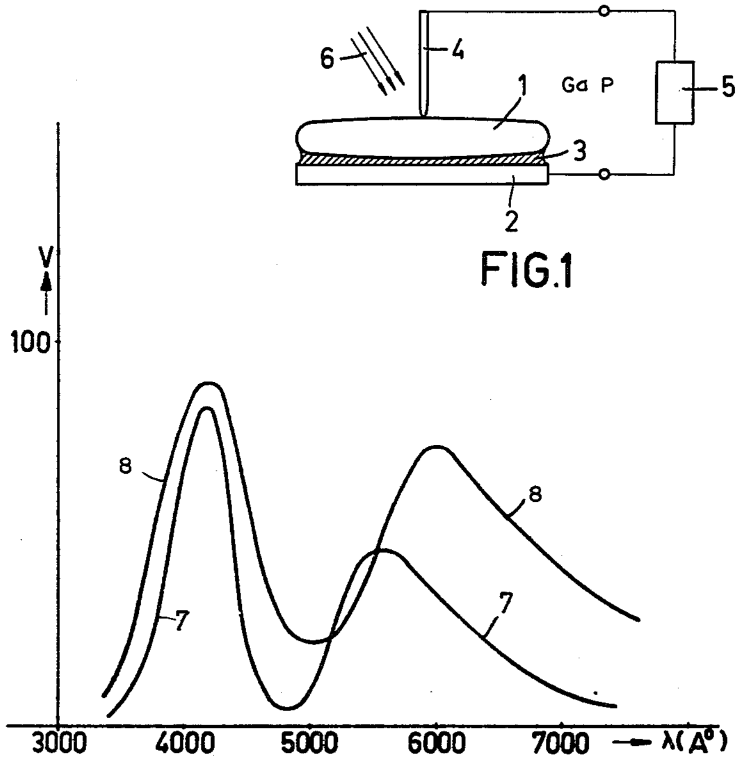
FIGURE 1 shows schematically a photodiode according to the present invention.
FIGURE 2 shows a graph of the spectral distribution of two blocking-layer photocells according to the invention.

Galliumphosphide crystals with p-n junctions were obtained in the following manner: the constituents gallium and phosphorus were heated in a two-legged, closed, evacuated quartz tube in a conventional double furnace to obtain a solution of phosphorus in gallium. To this end the leg containing the gallium was heated for about three hours at about 1220° C. and the leg containing the phosphorus at about 430° C. While the gallium-phosphorus solution containing an excess quantity of gallium produced in the gallium-containing leg is slowly cooled, at a cooling rate of for instance 10° C. per hour, galliumphosphide crystals crystallise out in a gallium phase. After the crystallisation the excess quantity of gallium could be removed by heating the reaction product at about 100° C. in a platinum crucible containing dilute hydrochloric acid. The GaP bodies thus obtained exhibit, as is found by an examination of the surface with the aid of a thin molybdenum pin, adjacent zones of opposite conductivity type, separated from each other by p-n junctions. Upon probing the surface with this molybdenum point contact the direction of rectification is reversed, when passing a p-n junction barrier at the surface. A p-n photodiode according to the invention as shown in FIGURE 1 could be obtained as follows: A crystal 1 prepared as described above was mounted on a copper plate 2 by means of a conductive silver poste 3. Upon scanning the opposite surface of the crystal with a molybdenum point contact 4 under normal daylight exposure, the location of a photosensitive p-n junction barrier was determined and the molybdenum point contact 4 was located near this p-n junction barrier. This p-n photodiode structure can be used as a photo-E.M.F. cell (for instance as a solar cell) in a circuit arrangement as further shown schematically in FIGURE 1. A load 5 is connected between the molybdenum contact 4 and the copper base 2. A radiation beam 6 was directed in the vicinity of the p-n junction. Then the spectral distribution of the open-circuit photo-voltage (photo-E.M.F.) was measured, the source of radiation being a tungsten band lamp having an effective temperature of about 3000° K., use being made of a monochromator. After correction of the measured values of the photovoltage for the spectral distribution of the tungsten band lamp and the monochromator, a spectral distribution of the photovoltage with these crystals was found as is indicated in FIG. 2 by the curve 7. In this FIGURE 2 the wavelength of the radiation in A. is plotted on the abscissa and the photovoltage in arbitrary units on the ordinate. The curves represent measured values corrected to a constant photon density. The curve 1 exhibits a high sensitivity in the short-wave portion of the visible spectrum and in the long-wave portion. In the long-wave portion a maximum occurs at about 5600 A. and in the short-wave portion at about 4200 A. From further experiments it has appeared that the high sensitivity in the long-wave portion with crystals having an excess quantity of gallium is to be attributed to phosphorus deficiencies. The high sensitivity in the short-wave portion is also found with crystals having a different doping and with strongly stoichiometric GaP crystals. By doping with other foreign atoms the sensitivity range may be varied, particularly in the long-wave portion. The curve 8, for example relates to a zinc-doped GaP crystal which was manufactured in the same manner as described above, the difference being only that before the thermal treatment a quantity of zinc was added to the gallium and that the coldest area was heated at about 450° C. Thus a crystal is obtained, of which the surface exhibits adjacent zones of opposite conductivity types similarly to the crystals relating to curve 7, while by means of a pin a sensitive area can be found in a simple manner. It is evident from the variation of curve 8 that also with these crystals a high sensitivity is obtained in the short-wave and also in the long-wave portion of the visible spectrum, the maximum in the long-wave portion being displaced to about 6000 A. From further investigations it appeared that this maximum is due to the zinc addition. The fact that this photo-voltage is related to a p-n junction in the crystal was confirmed inter alia also by the fact that, when covering the pin with a light-impervious envelope, especially in the proximity of the metal semi-conductive contact, substantially the same spectral distribution is obtained.

When examining the variation of the open-circuit photo-voltage, and of the short-circuit photo-current with the intensity of the monochromatic radiation, it appeared that for comparatively low radiation intensities the photovoltage increased linearly and with higher radiation intensities increased exponentially with the radiation intensity and that the short-circuit current was directly proportional to the incident radiation intensity, which was found in the same manner with other blocking-layer photocells. The blocking-layer photo-cells exhibit a particularly high sensitivity. With a radiation of about 20 Lux the photo-voltage amounts already to 0.3 v. and in sunlight about 1 v. With even higher radiation intensities photo-voltages of about 1.3 v. were measured. For the short-circuit current density were measured, in sunlight, values of about 3 to 4 ma./cm.$^2$.

It should furthermore be noted that the invention is, of course, not restricted to the examples described above. By doping additionally with other suitable foreign atoms and by controlling the concentration of present foreign atoms the spectral distribution may be acted upon at will, particularly the spectral distribution in the long-wave portion of the spectrum. It will furthermore be obvious that the same favorable photo-effects according to the invention will occur also with differently manufactured p-n blocking-layer photo-cells of galliumphosphide, in which the p-n junctions are obtained by doping, for example, a GaP monocrystal with suitable acceptors, for example an excess quantity of phosphorus or donors, for example, sulphur or an excess quantity of gallium, particularly if the p-n junction is not located beyond the effective range of the crystal surface on which the radiation is incident. Although the blocking-layer photocell according to the invention is particularly suitable for use as a photo-voltaic cell operated without a bias voltage, the cell may be used as a blocking layer photocell with a bias voltage, while the spectral distribution is maintained, provision being made for biasing the p-n junction in the blocking direction, while the variation of the blocking resistance under the action of the radiation intensity is utilized. With the crystals described above the same spectral distributions were measured, for example, also when a blocking bias voltage was applied to the p-n junction.

What is claimed is:

1. A semiconductor photocell responsive to visible radiation, comprising a body containing an active region consisting essentially of gallium-phosphide (GaP) and within the said active region adjacent zones of p-type and n-type conductivity forming a p-n junction, and contacts to spaced regions of the body at opposite sides of the said p-n junction, said body being arranged to receive the radiation on a surface thereof in the vicinity of the said p-n junction.

2. A semiconductor photocell as set forth in claim 1, wherein the n-type zone contains an excess of gallium.

3. A semiconductor photocell as set forth in claim 1, wherein the p-type zone contains zinc as a doping impurity.

4. A semiconductor photocell responsive to long wavelength and short wavelength visible radiation, comprising a body containing an active region consisting essentially of gallium-phosphide (GaP) whose absorption edge occurs at a wavelength lying between the said long and short wavelengths and within the said active region adjacent zones of p-type and n-type conductivity forming a p-n-junction, and contacts to spaced regions of the body at opposite sides of the said p-n junction, said body being arranged to receive the radiation on a surface thereof in the vicinity of the said p-n junction.

5. A semiconductor photocell as set forth in claim 4 wherein means are included for back-biasing the said p-n junction.

6. A semiconductor photovoltaic cell responsive to visible radiation, comprising a body containing an active region consisting essentially of gallium-phosphide (GaP) and within the said active region adjacent zones of p-type and n-type conductivity forming a p-n junction, and contacts to spaced regions of the body at opposite sides of the said p-n junction, said body being arranged to receive the radiation on a surface thereof in the proximity of the said p-n junction, said cell operating without an external applied voltage.

References Cited in the file of this patent

UNITED STATES PATENTS

| | | |
|---|---|---|
| 2,928,950 | Myer | Mar. 15, 1960 |
| 2,929,859 | Loferski | Mar. 22, 1960 |
| 2,929,923 | Lehovec | Mar. 22, 1960 |
| 2,949,498 | Jackson | Aug. 16, 1960 |

OTHER REFERENCES

Coblenz: Electronics, Nov. 1, 1957, vol. 30, No. 11, pages 144–149.